D. C. MORRIS.
Car-Couplings.
No. 137,617.
Patented April 8, 1873.
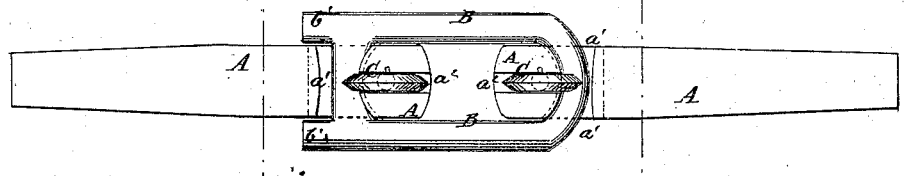
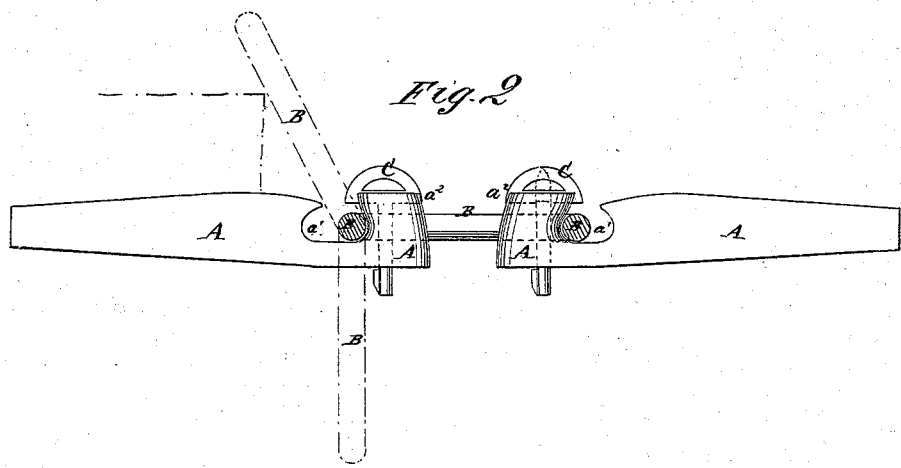
Witnesses:
A. W. Almqvist
C. Sedgwick
Inventor:
D. C. Morris
Per Munn & Co
Attorneys.

UNITED STATES PATENT OFFICE.

DEMCY C. MORRIS, OF NEW SHARON, IOWA.

IMPROVEMENT IN CAR-COUPLINGS.

Specification forming part of Letters Patent No. 137,617, dated April 8, 1873; application filed March 1, 1873.

*To all whom it may concern:*

Be it known that I, DEMCY C. MORRIS, M. D., of New Sharon, in the county of Mahaska and State of Iowa, have invented a new and useful Improvement in Car-Coupling, of which the following is a specification:

Figure 1 is a top view of my improved car-coupling. Fig. 2 is a side view of the same, part of the link being broken away to show the construction.

My invention has for its object to furnish an improved car-coupling, simple in construction, convenient and safe in use, and reliable in operation, and which shall be so constructed that the cars shall couple themselves as they are run together, and which cannot become accidentally uncoupled, and thus break up the train when running. The invention consists in the bumper-heads having transverse notches or grooves, and longitudinal notches or grooves, formed in the upper sides of their outer ends, the link having arms formed upon one end, and the buttons in combination with each other, as hereinafter fully described.

A represents the bumper-heads of two adjacent cars, upon the upper side of each of which, near its outer end, is formed a transverse notch or groove, $a^1$, to receive the coupling-link B. The link B is made with two short arms, $b'$, at one end, upon the ends of its side bars, as shown in Fig. 1, to keep it in place when turned up in position for coupling. In the upper sides of the ends of the bumpers A is formed a longitudinal notch or groove, $a^2$, to receive the shoulders or cross-heads of the buttons C, which are formed upon the upper ends of pins or stems which pass down through holes in the ends of said bumpers A. The buttons C are so formed that when turned into a longitudinal position their ends may project over the transverse notches $a^1$ in the said bumper-heads, and thus keep the coupling-link from getting out of place accidentally. When the buttons C have been raised from grooves $a^2$ and turned one-quarter around, the link will pass into and out of grooves $a^1$ freely.

In coupling cars with my improved coupling the link B is turned up against the end of the car, as shown by the dotted lines in Fig. 2. Then as the bumpers A strike each other, as the cars are run together, the concussion will throw down the link, which will drop into the notch $a^1$ of the bumper A of the other car, and thus complete the coupling. After the train has been made up the attendant can pass along the train and turn the buttons C into the groove $a^1$ with perfect safety. When not required for use the link B may be allowed to hang down beneath the bumper-head, as shown in Fig. 2, so that it cannot be injured or broken should two cars be run together.

The link B should be made of such a length that it may be loose in the grooves or notches $a^1$ when the bumpers A strike against each other, so that it cannot be strained or broken in that way.

Having thus described my invention, I claim as new and desire to secure by Letters Patent—

The bumper-heads A having transverse notches or grooves $a^1$, and longitudinal notches or grooves $a^2$ formed in the upper sides of their outer ends, the link B having arms $b'$ formed upon one end, and the buttons C in combination with each other, substantially as herein shown and described.

D. C. MORRIS.

Witnesses:
    G. B. GOULD,
    D. F. NICHOL.